(12) United States Patent
Sharfuddin et al.

(10) Patent No.: US 10,601,858 B2
(45) Date of Patent: *Mar. 24, 2020

(54) ENDPOINT VULNERABILITY ANALYSIS PLATFORM WITH INTELLIGENT THREAT ACTORS

(71) Applicant: Scythe, Inc., Arlington, VA (US)

(72) Inventors: Ateeq Sharfuddin, Falls Church, VA (US); Bryson Bort, Arlington, VA (US); Robert W. Winchester-Mauck, Reston, VA (US)

(73) Assignee: Scythe, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,442

(22) Filed: Jan. 11, 2019

(65) Prior Publication Data

US 2019/0207971 A1    Jul. 4, 2019

Related U.S. Application Data

(63) Continuation-in-part of application No. 15/865,509, filed on Jan. 9, 2018, now Pat. No. 10,225,276.

(60) Provisional application No. 62/452,418, filed on Jan. 31, 2017, provisional application No. 62/626,379, filed on Feb. 5, 2018.

(51) Int. Cl.
*H04L 29/06* (2006.01)
*G06F 9/445* (2018.01)
*A63F 13/80* (2014.01)
*A63F 13/46* (2014.01)
*H04L 29/08* (2006.01)

(52) U.S. Cl.
CPC .......... *H04L 63/1433* (2013.01); *A63F 13/46* (2014.09); *A63F 13/80* (2014.09); *G06F 9/445* (2013.01); *G06F 9/44505* (2013.01); *A63F 2300/80* (2013.01); *H04L 67/10* (2013.01); *H04L 67/42* (2013.01)

(58) Field of Classification Search
None
See application file for complete search history.

(56) References Cited

U.S. PATENT DOCUMENTS

2006/0010357 A1* 1/2006 D'Alo ................. G06F 11/0757
714/100
2017/0034204 A1* 2/2017 El-Moussa ............ G06F 21/577

* cited by examiner

*Primary Examiner* — William J. Goodchild

(57) ABSTRACT

The present invention relates to methods, network devices, and machine-readable media for an integrated environment for a method of environment security validation through controlled computer network exploitation. A set of parameters is received from an operator over the network. Based on these parameters an attack campaign is performed on the environment. In the course of the campaign, vulnerable hardware and software in the attacked network are identified. In another scenario, vulnerable hardware and software are mitigated until vendors provide official patches.

15 Claims, 6 Drawing Sheets

FIG. 6

| Campaign: {Campaign Name} | Start Time: {Start Time} | End Time: {End Time} |
|---|---|---|
| Total Points Available: {Z} | | |
| Team Blue Points: {a} + {b} + {c} | | |
| Coalition Alpha Score: {a} | Coalition Bravo Score: {b} | Coalition Charlie Score: {c} |
| Team Red Points: {Z} - {a} - {b} - {c} | | |
| Coalition XBOW Score: {Z} - {a} - {b} - {c} | | |

ENDPOINT VULNERABILITY ANALYSIS PLATFORM WITH INTELLIGENT THREAT ACTORS

CROSS-REFERENCE TO RELATED APPLICATIONS

This application is a continuation-in-part of application Ser. No. 15/865,509, filed 9 Jan. 2018, which claims the benefit of U.S. Provisional Application No. 62/452,418, filed 31 Jan. 2017, the contents of each of which are hereby incorporated in their entireties. This application also claims the benefit of U.S. Provisional Application No. 62/626,379 filed 5 Feb. 2018, the content of which is hereby incorporated in its entirety.

FIELD OF THE INVENTION

The present invention relates generally to computer security, and more particularly to methods, network devices, and machine-readable media for an integrated environment for automating and gamifying the process of detecting vulnerabilities at endpoints while facilitating patching of detected vulnerabilities.

BACKGROUND OF THE INVENTION

Vulnerabilities have been found in various types of software such as, for example, operating systems and software applications. The term "vulnerability" refers to a security defect in a system or software that permits an attacker to violate the confidentiality, integrity, operations, availability, access control, and/or data of the system or software. Vulnerabilities may result from bugs or design flaws in the system or software. The term "exploit" refers to software, data, or a sequence of commands that takes advantage of a vulnerability in order to cause unintended or unanticipated behavior to occur on computer software or hardware. Such behavior could include gaining control of a computer system, allowing privilege escalation, or a denial-of-service (DoS or related DDoS) attack. An exploit allows an attacker to execute arbitrary code on a computer. Typically, an attacker will manually review the code of a software program, identify a vulnerability, or bug, and attempt to exploit that vulnerability. If the vulnerability is exploitable, the attacker will seize control of the software, and any computing device running the software, until the exploit is discovered and removed, and the vulnerability is fixed.

The susceptibility of computer systems to unauthorized access or use is widely recognized. These vulnerabilities range from minor annoyances to critical national security risks. Today, given the ubiquitous nature of Internet communications and the value of information and transactions hosted on the public internet, vulnerabilities are discovered and exploited at alarming rates.

Automated tools facilitate the probing of systems and discovery of vulnerable systems and configurations. Manual, or somewhat automated, techniques can be suitable for attackers when seeking vulnerabilities, as they only need to find one exploitable bug to be successful in compromising a computing system. However, existing systems for discovery of vulnerabilities are limited because they do not actually attempt exploitation on an endpoint in a production system, and do not scale. Thus, what is needed is a system for allowing network security personnel to quickly discern malicious messages from a large volume of reported threats.

Furthermore, to train incident response teams, canned scenarios are not realistic and quickly become stale, and Red Teams, who manually perform much of their campaigns, are cost-prohibitive. It would be desirable to emulate real-world adversarial threat campaigns in an automated fashion, using gamification and machine learning.

BRIEF DESCRIPTION OF THE DRAWINGS

FIG. 6 illustrates an example leaderboard instantiation according to one embodiment.

DETAILED DESCRIPTION

Figure 1:
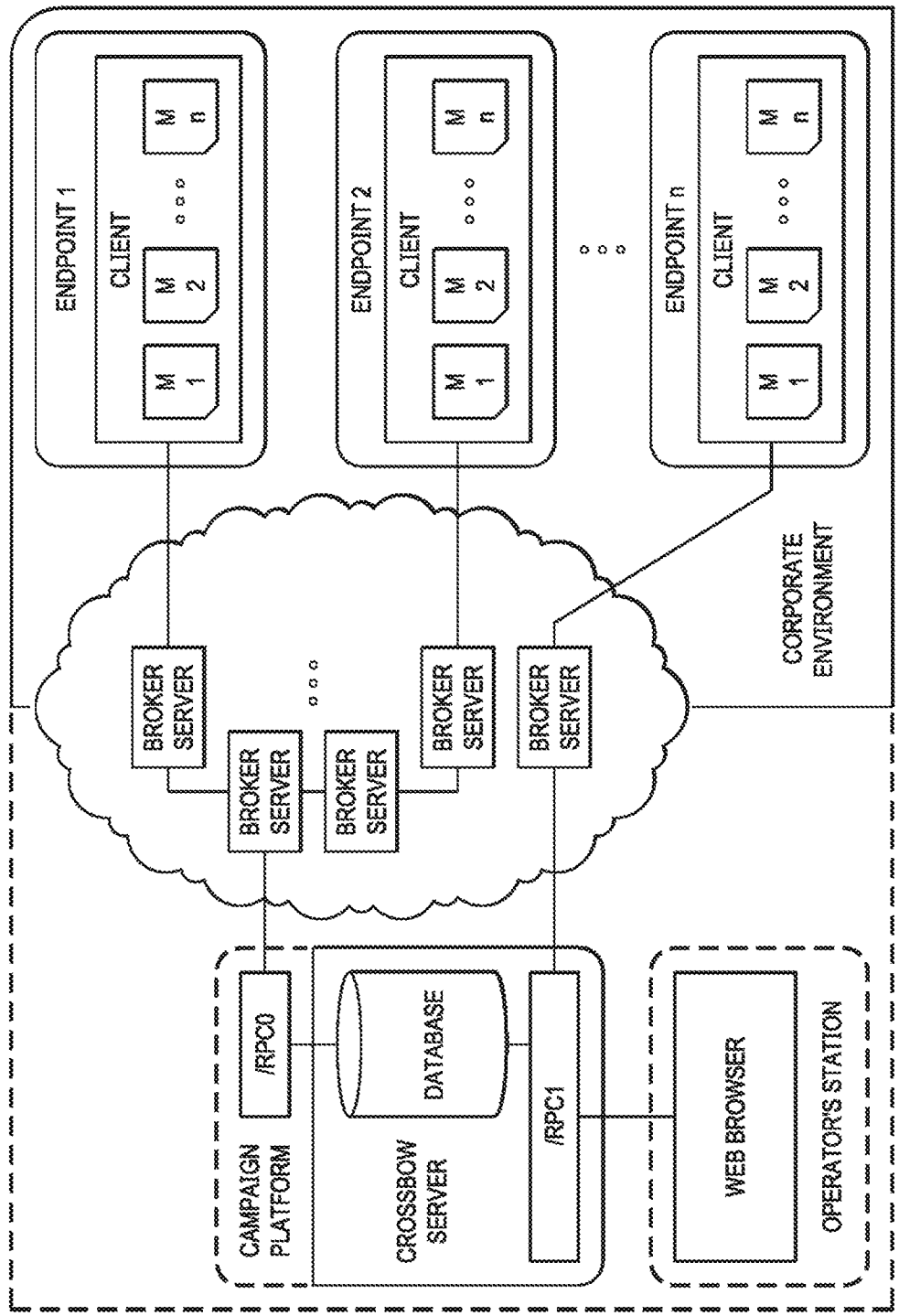
FIG. 1 illustrates an example system architecture for communicating between management servers and endpoint clients according to one embodiment.

In the following description of embodiments, reference is made to the accompanying drawings which form a part hereof, and in which it is shown by way of illustration specific embodiments of claimed subject matter. It is to be understood that other embodiments may be used and changes or alterations, such as structural changes, may be made. All embodiments, changes or alterations are not departures from scope with respect to intended claimed subject matter. While the steps below may be presented in a certain order, in some cases the ordering may be changed so that certain inputs are provided at different times or in a different order without changing the function of the systems and methods described. The procedures described herein could also be executed in different orders. Additionally, various computations that are described below, such as those within the user reputation modules, need not be performed in the order disclosed and other embodiments using alternative orderings of the computations could be readily implemented. In addition to being reordered, the computations could also be decomposed into sub-computations with the same results.

Overview of System Processes

The invention comprises a fault-tolerant platform comprising server components and endpoint components. The server components comprise one or more servers in communication with one or more electronic data stores, including at least one database. The endpoint components comprise at least one client, the client configured to operate on instructions and parameters provided by various modules. The platform can include a framework to enable an enterprise to identify weaknesses in its overall environment. The client can be generated by the server with an initial set of modules embedded that perform specific functionality. Additional modules may be transmitted to a client on demand.

The server generates instructions for agents and also processes results of instructions transmitted by agents. Using the results of instructions transmitted by the agents, the server generates new instructions for agents.

In some embodiments, the client can be a rudimentary multi-threaded non-console Windows™ executable with no graphical user interface. The client can support at least a minimal set of features and additional features can be provided by modules loaded into the client. The client can be constructed to operator specifications. An operator can construct a client for a particular campaign using the server. The operator selects the modules to be initially included in the client and specifies an initial set of parameters. With this information, the server can compile a client, which can then be deployed to an endpoint.

The server provides a mechanism for an operator to configure and view campaigns run against networks of choice. The servers also communicate with clients running on endpoints. The clients receive instructions on what to do next and also to transmit results of the instructions. The campaign configuration data, data received from a client, as well as data related to the health of a campaign are all stored in the database.

The base client itself can be intentionally simplistic in design. In some embodiments, the client can consist of a message queue and a module loader. Remaining functionality can be provided via modules that are embedded into the client at compile-time or transmitted to the client after deployment. The message queue functions as a job-scheduler to delegate a message to its intended recipient. The module loader loads embedded modules into the memory-address space of the client. A module can be constructed to perform any capability. For example, a module can provide instructions necessary for the client to communicate with the server. Modules built into the client can be embedded in the client as resources. Upon execution, the client loads the embedded modules into its memory-address space and initializes them. Client does not inherently receive any input. Modules will provide input. Client does not inherently provide any output. Modules will provide output.

Modules that the client loads provide any capability. Modules can provide services for communications or instrumentation. An example communications module would be one that supports transmission and reception of messages to and from the server over secure Hypertext Terminal Protocol (HTTPS). An example instrumentation module would be one that enumerates processes currently running on the endpoint. A module can provide a mechanism to escalate privileges of the client to that of a higher-privileged user. Modules can also be designed to support simulation of known attack vectors or previously publicized campaigns. Any arbitrary capability can be supported through the modules.

There can be numerous types of servers in the platform, each type providing distinct functionality. Operators of campaigns can interact with the web servers on the platform. Clients transmit and receive messages from the campaign platform (CP) servers. A list of intermediary broker servers, to relay each message, may exist in between a campaign platform server and a client. Database servers can host the data for the platform.

The platform supports role-based access control, two basic roles being administrator and operator. An administrator is a higher-privileged user than an operator and can make changes that affect the platform itself. An operator can make changes that affect a campaign. An operator can also start a new campaign and complete an existing campaign. When starting a campaign, an operator may set the start date and end date of the campaign, set a boundary to limit which computers the campaign can run on, select which modules will be embedded into the client, a deployment mechanism, and any other configuration specific to the campaign.

The platform also avails its Threat Catalog to operators. An operator may select a preset configuration from this Threat Catalog for the campaign. The Threat Catalog contains a list of previously published exploits. Each item in this list provides all the configuration information necessary to simulate the published compromise. For example, if an operator wants to simulate the Miniduke Advanced Persistent Threat (APT) on a target network, the operator selects this element from the Threat Catalog for the campaign. The platform will emulate the attack vectors used by Miniduke APT against the target network.

The operator can view the overall progress of the campaign on the platform's web server. The operator can have full view with respect to which endpoints (and other devices) have been successfully compromised, which have been attempted but failed, the network layout and network resources among other instrumentation information as observed by the platform, as well as statistics and health-information related to the campaign. From the platform's web servers, the operator can interact with individual endpoints on which the client is running. The operator, for example, can take screenshots, enumerate what is on the hard-drive of the endpoint, or download a file from the endpoint. The web server offers a terminal window, similar in appearance to a bash shell, for respective endpoints that the operator can use to issue commands to the clients.

In addition to previously published compromises, the Threat Catalog can also contain items derived from non-public zero-day vulnerabilities. These zero-day vulnerability information arrive from an auction-based marketplace. Buyers of vulnerabilities are interested in protecting their systems and networks and are willing to pay more for quicker access to this information than what vendors offer as reward. Sellers of vulnerabilities are interested social benefit but also in maximizing their reward. Both buyers and sellers will have reputation. Information on the vulnerability, as well as buyers and sellers, can be electronically tracked. The platform can act as a market-maker and aims to do is to provide market-equilibrium for non-published vulnerabilities.

When starting a campaign, the operator can be provided different deployment mechanisms. For example, the operator can choose an email campaign, in which case the client is sent to users over email. The operator can choose a physical campaign, where the client will be manually installed by a user. The operator can choose an Internet campaign, where a user can visit and download the client. In the case of non-physical deployments, servers are provisioned on-demand with necessary services to support such deployments.

The campaign platform servers transmit and receive messages to and from clients. These can be lightweight servers with only this limited functionality. The intermediary broker servers relay messages between the campaign platform servers and the endpoints. There can be a chain of intermediary broker servers in between a campaign platform server and an endpoint. The database servers host the campaign configuration information, as well as the message requests and responses between servers and clients. The platform can be hosted both on premise and as a software-as-a-service (SaaS) hosted on the cloud.

The operator can select to individually unload the client from endpoints. Once the campaign expires, the clients can automatically unload. Future clients for this specific campaign will also not load after campaign expiration. An operator can also choose to finish the campaign partway through the campaign.

Servers

A server provides mechanisms to both create and manage ongoing campaigns. A server can include a front-end graphical user interface (GUI). A server services requests from both clients and from browsers that operators can use to manage campaigns. The server can support multiple modes of operation, including as non-limiting examples Campaign Platform (CP), Campaign Management, or both.

Campaign Platform: This mode of operation supports clients that interact with the server. Operators are not able to communicate with a server running in Campaign Platform mode.

Campaign Management: This mode of operation supports operators to browse and interact with the server. In this mode, clients are unable to communicate with this particular server.

Both: This mode of the server supports both Campaign Platform and Campaign Management. That is, both operators and clients can communicate with the particular server.

Operator Session Management

Operators can login using a user name and password combination. The server upon installation can have a default administrator account created. This default administrator account can only be logged into from a browser running on the same machine as the server. Upon logon, a session identifier will be generated and returned to the browser. In some embodiments, this session identifier must be used for all future calls for the current session. The session identifier can be a globally unique identifier (GUID).

A global list of a 2-tuple (session identifier, IP:port) can be kept and expired sessions will be purged periodically from this list. The logged in user account information will be retrievable from the session identifier. As an example, a session will timeout after 30 minutes, by default.

Campaign Management

The operator is able to start a campaign, manage an ongoing campaign, and review completed campaigns. The operator selects a campaign name, the boundary of the campaign (i.e., an IP range, a domain, or a specific endpoint), modules to preload (i.e., compile) into the client, and the start and end dates for the campaign. As non-limiting examples, modules to load can be communications module, screenshot module, file upload module, run module, self-deletion module, persistence module, and so forth. A campaign can have a specific end-date or run indefinitely until the operator asks the clients to clean up.

The operator can select and manage currently ongoing campaigns. The operator can request clients to download and run specific modules, uninstall, send specific requests for the client to process, and so forth. The operator can select a completed campaign and review statistics of that campaign, as well as what was gathered. The operator can select and archive a completed campaign to hide it from the front-end GUI.

The server maintains a list of modules for the client to load. The server can either compile the modules into the endpoint client, or an operator may decide to transmit a module to the client on-demand. Operators may also request a client to unload a loaded module from its memory address-space.

An operator may also upload new modules into the server through a user interface. The server verifies that the module package is signed by a trusted party before adding it to its list of modules. If the module package already exists, upload of the module package fails, and the operator is notified in the user interface. A module package consists of multiple components. For example, the server component of the module package will perform tasks for the module on the server. The client component of the module package is the module that will be loaded into the client. The server and database installation components of a module package will be run upon successful upload. Similarly, server and database uninstallation components of a module package will be run when a module is being removed (uninstalled) from the system.

The server will receive data from two sources: operators observing the status of the campaign or updating a campaign, and the client. In both cases, data can be arriving as eXtensible Markup Language (XML) or JavaScript Object Notation (JSON) requests and limitations of this data will be based on the limits of XML or JSON themselves.

The operators will browse to the server, and the browser will send/receive HTTP requests, for example HTTP GET requests. Requests will arrive on top of HTTP GET requests, as well, where the /RPC0 resource will be used for communicating with clients and the /RPC1 resource will be used for communicating with operators' browsers. The browser will also make GET requests for resources such as files. A client can also send a HTTP POST request to transmit a response message to a server.

In some embodiments, the server operates over HTTPS. Communications modules may provide broker servers to reside between /RPC0 server over HTTP or HTTPS and the client.

A server transmits data to operators' browsers and to clients. These are responses to the requests from the operators and the clients. These can arrive over HTTP GET or POST requests. The server can provide HTTP GET or HTTP POST responses to the browsers and clients.

When operators browse resources on the server, the browser will send/receive HTTP requests that are non /RPC1 (i.e., for file resources). The server can serve both resources (HTML files, images, JavaScript files, etc.), as well as requests that will reside under /RPC0 (for clients) and /RPC1 resources (for browsers).

Server Database

A server database stores settings and module specific configuration information. The server database also holds data collected by clients, as well. The settings table contains a list of global settings for the platform. Modules may install module-specific information into the database. The server accesses the database. The client is able to retrieve information from the database via the server. Operators are able to view what is available in the database through the server.

Client: Loading a Module

The client may be installed with a set of modules already included. These modules can be compiled as resources in the client. When the client is started, it will load these embedded modules into its memory-address space. The client implements its own loader to load these modules. Once the module is loaded, the client will call the module's init function to initialize the module. Additional modules may be transmitted by the server during a campaign after a client has already been initialized.

Client: Unloading a Module

A module will unload when requested by the client. If the module returns a status indicating error when its init function is called the client will assume the module did not successfully initialize and will unload the module from its memory-address space. The client will call the module's deinit function prior to unloading the module only if the module previously returned a successful status when its init function was called.

Client: Message Queues

A client can offer two thread-safe message queues: a high priority message queue and a regular priority message queue. Usually, all messages will be posted to the regular priority message queue. High priority message queue is utilized for messages that need to be immediately processed, disregarding the scheduling priority requests of other messages. Each element in the message queue can consist of a 5-tuple: (MessageId, OriginatingModule, DestinationModuleType, DestinationModule, MessageSize, Message). Modules post messages to a message queue. The client pulls messages from these queues and identifies the best module suited to process the respective messages. The message data structure is described below.

MessageId: MessageId will be a 16-byte globally unique identifier (GUID).

OriginatingModule: OriginatingModule is a 16-byte globally unique identifier and specifies the specific module that can created this message. If OriginatingModule is empty, it means message was generated by the campaign platform server.

DestinationModuleType: ModuleType will be four-bytes in size and shall indicate the type of module that is able to process the message.

DestinationModule: DestinationModule is a 16-byte globally unique identifier and specifies the specific module that can process the message. If DestinationModule is empty, any module of ModuleType is able to process the message.

OriginModule: OriginModule is a 16-byte globally unique identifier and specifies who generate the message.

Flags: A four-byte integer describing the message further.

Context: A four-byte integer used for context.

MessageSize: The message size indicates the size of the message. This is an eight-byte field.

Message: The message will be of arbitrary size. Format and content of messages itself will be determined by each module.

Campaign Tracking

A client can be generated with a unique client identifier, a globally unique identifier (GUID) that is incorporated into the client. When the client is constructed by an operator, campaign-specific information (such as server's address) is embedded into the client.

As part of the campaign, a client may leap from one machine to another. This is still considered part of the same campaign and the client shall maintain the same campaign identifier. There can be a one-to-one relationship between a client and a campaign.

Client: Modules

Modules provide specialized functionality. For example, a module can provide a communications mechanism from a client to the server or a module can provide a mechanism to execute a command on an endpoint.

Modules can be packaged. There can be multiple components to a module. For example, a module might require database changes on the server upon installation in order to function correctly. The package format can be as follows: [Package Format Version|Package Size|Package ID|Module ID|Reserved|Module Name|Module Type|Version|Number of Components|Component 1|Component 2| . . . |Component n|Signature]

Package Format Version Field: This field is four bytes in size. This field identifies the version of the package format.

Package Size Field: This field is four bytes in size. This field describes the size of the entire module package, including the package size field, and all the components of the module within the package.

Package Identifier Field: This field is 16 bytes in size, and is a globally unique identifier (GUID). Each module package will have a unique package identifier.

Module Identifier Field: This field is 16 bytes in size, and is a globally unique identifier (GUID). Each module will have a unique module identifier. The module identifier will be the same across different versions of the same module, however.

Reserved Field: This field is four bytes in size, and will be 0.

Module Name Field: This field is 256 bytes in size. The module name will be in Unicode and be terminated with a null character. Thus, the field can support module names that are at most 127 characters in length plus the terminating null character.

Module Type Field: This field is four bytes in size. The module type distinguishes a category for a module. A module may support multiple categories. Example categories include: CATEGORY_INPUT_COMMUNICATION= 1, CATEGORY_OUTPUT_COMMUNICATION=2, CATEGORY_WORKER=4

When the client dequeues a message to be offered to a module, the client determines which modules can process the message. The message may indicate that the message can only be processed by a specific module, per the DestinationModule field in the message), or may indicate that any module of a specific type can process it. In the latter case, the client can select an arbitrary module of the stated type and offer the message to this selected module.

Version Field: The version field is four bytes in size and indicates the version of the module, specifically the upper two bytes indicate the major version and the lower two bytes indicate the minor version.

Number of Components Field: This field is four bytes in size. This field specifies how many component blobs are in the package immediately following this field.

Component Fields: These fields is of arbitrary size. Each component blob will meet the component specification that follows below.

Signature Field: This field will be 32 bytes in size and is a SHA-256 HMAC and will be a signature on the entire Package (excluding this Signature field).

Component: [Component Size|Component ID|Component Type|Reserved|Reserved2|Reserved3|Reserved4|Component Data Size|Component Data Hash|Component Data]

Component Size Field: This field is four bytes in size. This field specifies how large this component blob is (including this field).

Component Identifier Field: This field is 16 bytes in size. This field is a globally unique identifier for the component in this module package.

Component Type Field: This field is four bytes in size. This field identifies what type of component this is in the module: COMPONENT_TYPE_CLIENT_INSTALL=1, COMPONENT_TYPE_CLIENT_UNINSTALL=2, COMPONENT_TYPE_SERVER_INSTALL=3, COMPONENT_TYPE_SERVER_UNINSTALL=4, COMPONENT_TYPE_DATABASE_INSTALL=5, COMPONENT_TYPE_DATABASE_UNINSTALL=6

Reserved1, Reserved2, Reserved3, Reserved4 Fields: These fields are four bytes in size, each. These fields are reserved and must be 0.

Component Data Size Field: This field is four bytes in size. This field specifies how large the Component Data field is.

Component Data Hash Field: This field is 32 bytes in size. This field is a HMAC-SHA-256 of the Component Data field.

Component Data Field: This field is of arbitrary size and contains the binary data of the component.

Client Component: The client component of a module runs on the endpoint. This component will have three functions: init, run, and deinit.

The init function: Once the module is loaded by the client, the client will call the module's init function. The init function accepts one parameter, client, which is a reference to the client itself. The module saves this client parameter in memory and will use it in the future. The init function will return a status code which may indicate failure. In that case, the client will not load the module.

The run function: The client calls the run function with a message as a parameter. The run function takes two parameters, the first parameter is a pointer to the message, and the second parameter is a reserved pointer and must be 0.

The getinfo function: The client calls this getinfo function to retrieve module information. This populates the module information fields: version, module type, and module identifier.

The deinit function: The client calls the deinit function of a module to request the module to cleanup itself from the client. The deinit function takes one parameter. This parameter is a reserved pointer and must be 0.

The module gets access to the client's message queue from the client parameter during initialization and registers itself with the queue. When a message is available in the message queue that this module can process, the client will offer the message to this module. The module will post new messages to the client's message queue to be handled by other modules, e.g., a communications module.

Messages

Communication performed within the client and in between the client and server are in the form of messages. The format of the message is described below. The message has the following format: [MessageId, OriginId, DestinationType, DestinationId, Flags, Reserved, MessageSize, Message]

MessageId: This is a four byte field. This field contains an arbitrary number and is used primarily for testing.

OriginId: This is a 16 byte GUID. This field contains the GUID of the originator.

DestinationType: This is a four byte field. This field contains the type of module that destination module must be to process the message.

DestinationId: This is a 16-byte GUID. This field contains the GUID of the destination. This field is optional. If provided, only a module with this identifier supports processing this message.

Flags: This is a four byte field. There are no defined flags at the moment.

MessageSize: This is an eight-byte field and stores the length of the Message field.

Message: This is field is of arbitrary size and contains data that the destination knows how to process.

To support other communication protocols, a translation mechanism converts messages transmitted over another protocol into HTTP or HTTPS. HTTP and HTTPS are the only protocols that the campaign platform server supports. The translation mechanism can be implemented in a broker server. In addition to supporting other protocols for communication, multiple broker servers may be used as intermediary nodes in between a client and a campaign platform server to relay a message. This mechanism can allow intermediary broker servers to change routes dynamically on demand or periodically.

The broker servers provide simple input-output. Aside from validating the correctness of input the broker server does not do not inspect the input. The broker server can convert the input from one protocol into another. The broker server can also convert from one protocol to the same protocol (i.e., a null-broker, such as an HTTPS-to-HTTPS broker server), which can be used to relay the message over multiple servers HTTPS-to-HTTPS broker servers in between a client and a campaign platform server.

Steganography Module

A client can use steganography to covertly transmit messages to the server using an image file. There are several methods commonly used to hide messages inside an image file. One method is to append the message to the end of an image file. Such an image file will look like an ordinary file and can be viewed using any image viewer. The message contents is typically zipped before appending to the image. The receiver only has to extract the zipped file from the image to access the original message.

Another approach to hiding data within an image file is called Least Significant Bit (LSB) insertion. In this method, we encode the data into the image itself. We can take the binary representation of the data and overwrite the LSB of each byte within the image. If we are using a 24-bit color image file, the amount of change will be minimal and indiscernible to the human eye.

Each module can determine whether to use steganography to covertly transmit messages. This will be indicated during module initialization by settings in a configuration file. The configuration file will be embedded in the resource section of the module and will be accessible to the module. Prior to queueing a message for transmission to the server, the module will call a common steganography routine, passing in the message to send and an image to use.

The server will maintain a local store of suitable image files that clients will use for transmitting these messages. An operator will select the image/images that each client will use for transmission. Messages encoded with steganography will be sent to the server using the same transport mechanism as any other message. The server will decode and extract such messages.

In order to limit the size of the clients, image files will not be included. The server will send the image file to use after the client has initialized. New image files may need to be sent periodically. For further security; a message could be encrypted before it is encoded into an image. For instance, a message that is appended to the end of an image file could be zipped with a password before transmitting over a secure connection.

Loader Module

The loader module allows the deployment of additional modules to be added later after the client has already initialized.

The Loader module is always packaged as part of the client. Messages destined for this module contain a module to be loaded on demand. The loader will validate the contents of the message and load the contents of the message into the client's memory-address space.

Self-Delete Module

The self-delete module adds instructions to the client to delete the client's image from storage after the client shuts down.

File Download Module

The file download module provides functionality to allow the client to download a file from the server to a specified file path location in the endpoint. Integrity checking is performed after saving the file at the path to ensure it was successfully downloaded.

HTTP Module

The HTTP module can provide a mechanism for the client to communicate with the server over HTTP. This module is of type both CATEGORY_OUTPUT_COMMUNICATION and CATEGORY_INPUT_COMMUNICATION. For example, when a module wants to transmit data to the server, it will construct a message as described previously, set destination type CATEGORY_OUTPUT_COMMUNICATION, and post it to one of the client's message queue. When the client dequeues this message, the client determines which modules can process the message. In this case, the message indicates a destination type for output communication. The client can select the HTTP module to process the message. The HTTP module transmits the contents of the message to the server.

The HTTP module can POST the message using /RPC0 as the target. The HTTP module can periodically perform GET requests on /RPC0 to indicate the client's heartbeat and also retrieve any messages designated for the client. When the HTTP module receives a message, it enqueues this message into one of the client's queues.

Module Configuration

Some modules require configuration information. For instance, a communications module requires information such as the server IP address and port number of the server. A module can contain a configuration section that will be 32 KB in size. When the module is generated or deployed, the server will populate this resource section with module specific configuration information. For example, the HTTP module can have configuration information compiled into it, such as the server address, server port, server path, heartbeat period.

Other modules may require different information. Once the module is loaded by the client, the client will call the module's init function. The init function will use the previously stored handle information to fetch the configuration information from the resources section of the module.

Module Encryption

An operator constructs a client for a campaign on the server. The operator selects the modules that will be initially compiled into the client from a list of available modules. The server collects the selected modules and compiles them into the client.

Encrypting modules allows an operator to restrict the operating scope of the client (i.e., setting a campaign boundary). A client can be unrestricted, restricted to a domain, restricted to an IP address range, or restricted to a specific computer. The server can generate a random password that is used to encrypt each module. A key based on the operator's selection for boundary is then used to encrypt the random password and compile it into the client. The server then sets a flag (in plaintext). The plaintext flag and their corresponding values can be, but not limited to, as follows:

| Setting | Description |
| --- | --- |
| 0 | Unrestricted. The client is not restricted. The randomly generated symmetric passkey will not be encrypted |
| 1 | Restricted to domain. The randomly generated symmetric key will be encrypted using the domain name as the key. The operator on the server side will enter the domain name that is used to encrypt the password. |
| 2 | Restricted to computer. The randomly generated symmetric key will be encrypted using the computer name as the key. The operator on the server side will enter the computer name that is used to encrypt the key. |
| 3 | Restricted to IP address range. The randomly generated symmetric key will be encrypted using the IP address range as the key. The operator on the server side will enter the IP address range that is used to encrypt the key. |

All modules will be encrypted on the server side using a randomly generated password, even if the client is not restricted to a specific domain/computer name. If the client is not restricted, the password that is used to encrypt the modules will be compiled into the client as plain text.

Environment attributes of the endpoint are used as key to decrypt instructions. Consider the agent software to be in the form: [flags, limited instructions, encrypted instructions]. The agent software uses its initial limited set of instructions to capture values of environment attributes as specified by the flags field, and with these values derives a key K. The instructions to run can be generated by decrypting the encrypted instructions with key K.

A decryption failure occurs if the agent software is unable to decrypt received instructions. The failure may occur due to the lack of a key or an invalid signature upon decryption. When decryption failure occurs, the client has no further instructions to process and shuts down. Encryption can be by any means that obscures the content from an unintended recipient.

Auction Sourcing

An operator can select an item from a Threat Catalog and execute a scenario. For example, an operator can simulate "Miniduke APT" against their network. Items in this catalog can be publicly known threats. Items in this catalog can also be threats derived from information not yet publicly known.

In the auction marketplace, a seller lists a vulnerability discovery as a description on auction. The description can contain adequate information to amass buyer interest but is sufficiently broad so as to not disclose the vulnerability. The seller may or may not list a reserve price. The seller sets expiration time. The seller may set which form of bidding they support: single buyers and/or coalition of buyers. Buyers bid on this listed vulnerability discovery. A single buyer may outbid other buyers. A coalition of buyers may also bid same amount as current auction price. This is known as a coalition bid, where a coalition buyers are interested in the same vulnerability disclosure. In this example, if the current bidding price is A and three buyers bid this amount, the seller will receive 3A at the end of the auction. Another coalition of buyers may form to offer a price larger than 3A.

Buyers who win auction receive full vulnerability disclosure. Buyers in a coalition bid all must agree to the same outcome of the full vulnerability disclosure.

The platform acts as the broker for the vulnerability discovery and validates listings prior to auction. Buyers can request the platform to provide built-in mitigation against disclosure upon winning the auction. Buyers can request to have disclosure in the Threat Catalog for simulation against their network environment upon winning the auction.

Automation

Servers

A server provides mechanisms to both create and manage ongoing campaigns. A server can include a front-end graphical user interface (GUI). A server can support multiple modes of operation, including as non-limiting examples, a threat director.

The threat director mode of operation supports delivering a campaign (for example, via email), and for automating campaigns. That is, based on an agent's current state, the threat director instructs the agent what to do next. When a campaign emulates a specific threat, the threat director shepherds an agent from its first heartbeat to it removing itself from the device once its purpose is complete.

The threat director guides agents through decision trees when attacking a system. In one embodiment, each agent navigates a path through a decision tree with the help of the threat director. Based on the results these agents transmit, the threat director will observe and learn. Similarly, defenders will receive feedback that mitigations implemented against the threat actors are correct.

Definitions

Consider a multiplayer game with two teams, a defensive team and an offensive team. The contest ends at an arbitrator's chosen time. When the contest ends, the team with the most points is selected the winner. This may be modeled as a game G with m players, rules r, and an environment e.

Players

The platform's threat-actors are the offensive team consisting of a set of players $O=\{o_1, o_2, o_3, \ldots o_n\}$. The defenders are the defensive team consisting of a set of players $D=\{d_1, d_2, d_3, \ldots d_m\}$. The defenders can form multiple coalitions, $C_{D1}, C_{D2}, \ldots$. Similarly, it could be the case that multiple threat-actors form coalitions, $C_{O1}, C_{O2}, \ldots$. All coalitions are disjoint, e.g., $C_{D1} \cap C_{D2} = \{\emptyset\}$. Each coalition can have one or more individual players. A coalition may also have all players of a party. The union of all coalitions of a team is the entire team. A coalition's purpose is to maximize its own utility (payoff) while minimizing its cost. A coalition is agnostic towards other coalitions in its own team; however, a coalition is hostile towards all coalitions of the other team.

In some embodiments, the teams can comprise any combination of automated and/or manual processes. In some embodiments, a team can be entirely comprised of one or more bots.

Rules and Utility

The strategies played by the defensive team and offensive team are disjoint (i.e., competitive). The move each coalition makes is independent of other coalitions' moves. Consequently, a coalition is able to make multiple moves in sequence before any other coalition chooses to move since what a coalition does it not tied to other coalitions (that is, the contest plays out asynchronously). Similarly, in the case of the offensive team, a coalition selects the next preferred move based on its current state and observations.

Utility is based on the duration of the game, with a total final score Z. Each coalition receives a fractional score of this final score based on performance during the instance. For the offensive team, the longer a move has not been mitigated, the more utility the offensive team receives. Conversely, for the defensive team, the shorter time it takes to mitigate the offensive team's move, the more utility the team receives. In the example of a simple scenario where an offensive coalition has made three moves, and a defensive coalition successfully mitigated two of these moves before the instantiation finished, the defensive coalition receives ⅔, whereas the offensive coalition receives ⅓, where Z=1.

Environment

The environment where the contests take place is a test or production computer network environment.

Offensive Team Player

From a single automated adversarial threat-actor player's perspective, it is a single-player game, where the player is attempting to play the game as long as they can, bounded by the campaign end time chosen by the arbitrator at the start of the campaign. To simplify, each move the player makes only depends only its current state (Markov property). To learn from observations, the player shall utilize Q-learning or a variant (e.g., deep Q-networks or DQN, PAC, GQ, etc.). That is, the player uses a Q function to determine the next move, with initial conditions $Q_0$, learning rate a, and discount factor $\gamma$. As the player plays more and more instances of the game, each move is updated with inherent utility. Thus, given a current state and a number of choices for the next move, the player will select the next move which has the best utility. Since each instance of the game ends, after each instance, the player learns more about the environment. Specifically, the player iteratively learns which moves succeeded and which moves failed from past observations, and works backwards to identify best move at each state from the start state.

Leaderboard

The leaderboard presents real-time statistics. The leaderboard can be external and interface with the platform. The threat director can provide to the leaderboard the moves made. The leaderboard, keeping certain information provided by the threat director private, presents the current state of the game. As the defensive team mitigates moves made by the automated agents and informs leaderboard to verify, leaderboard will rely on information it receives from the threat director to identify if indeed the moves have been mitigated. In some embodiments, the threat director is not aware of actions defensive players have taken, only that certain moves it is making are no longer functioning.

System Architectures

Figure 2:
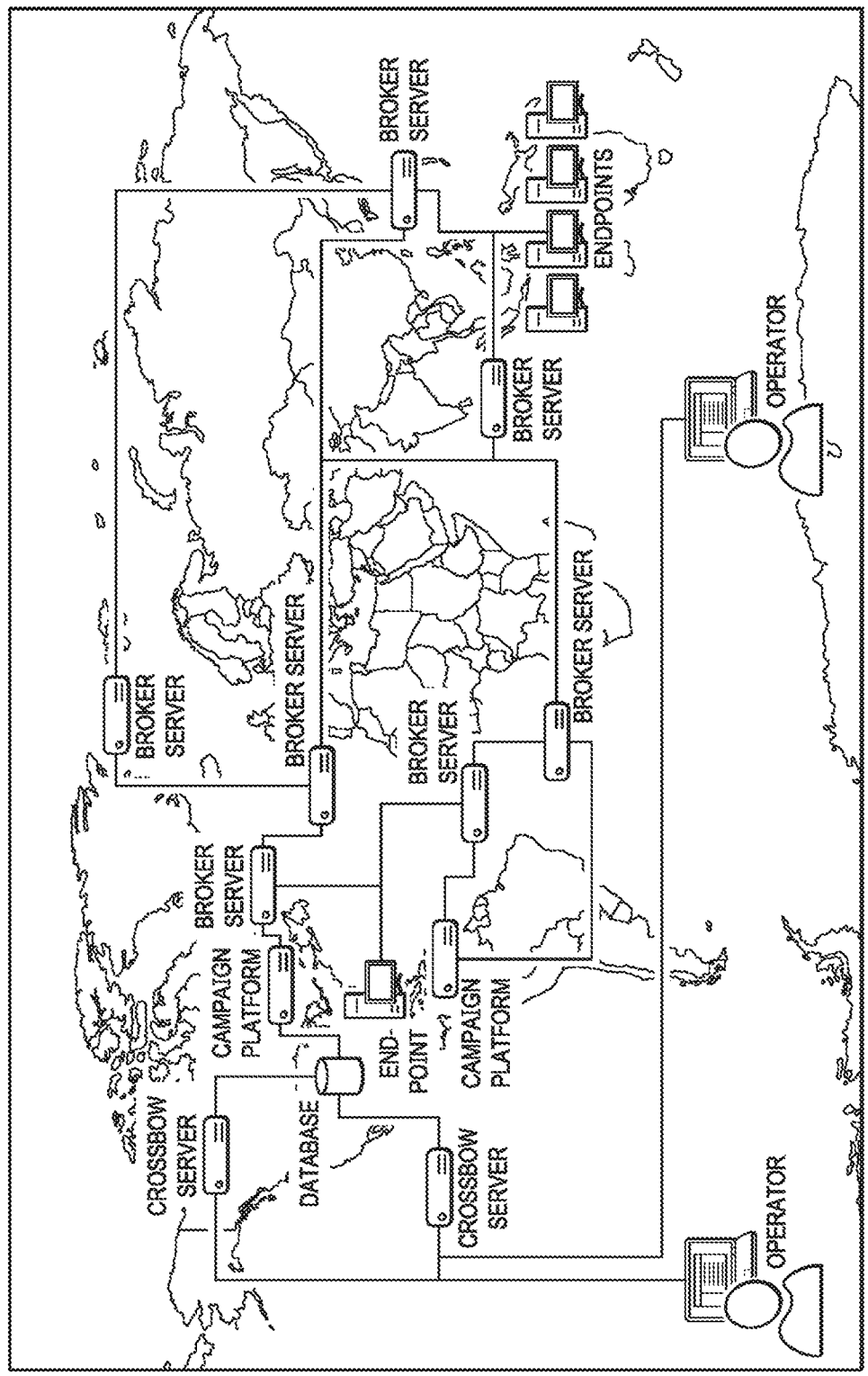
FIG. 2 illustrates an example arrangement of multiple operators communicating with multiple endpoints through a network of broker servers according to one embodiment.
Figure 3:
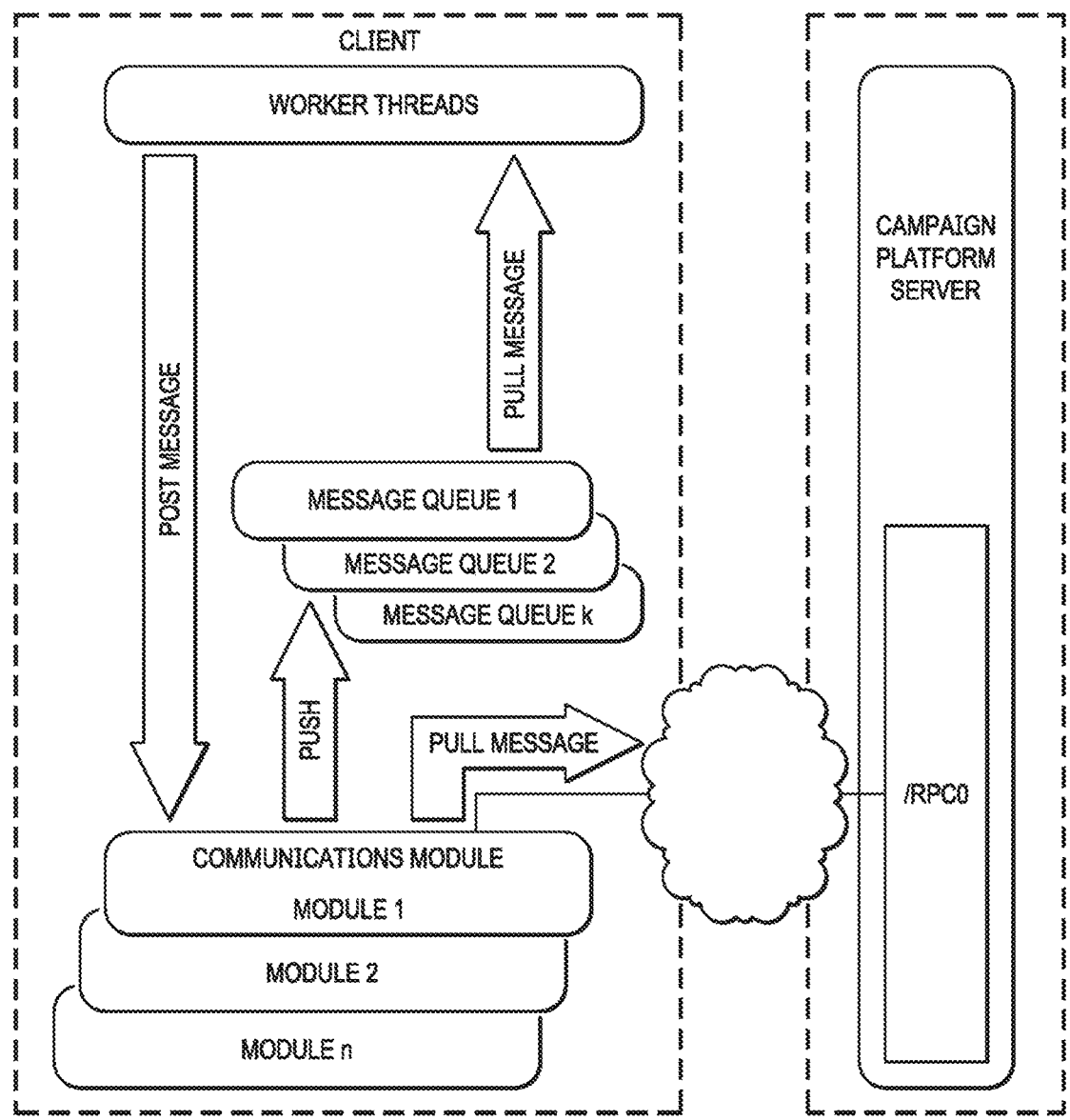
FIG. 3 illustrates an example message queue according to one embodiment.
Figure 4:
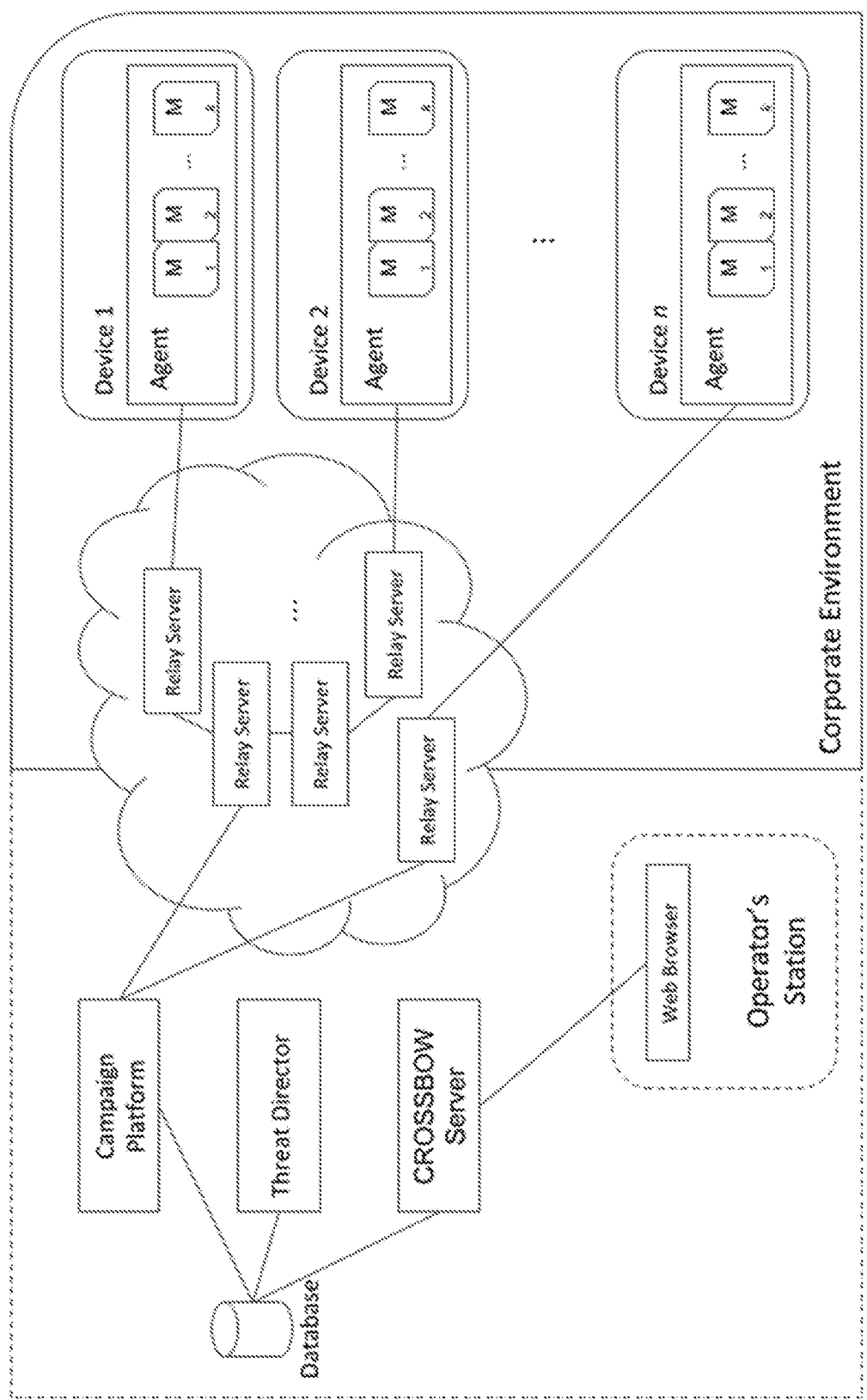
FIG. 4 illustrates an example system architecture for communication between management servers and endpoint agents according to one embodiment.
Figure 5:
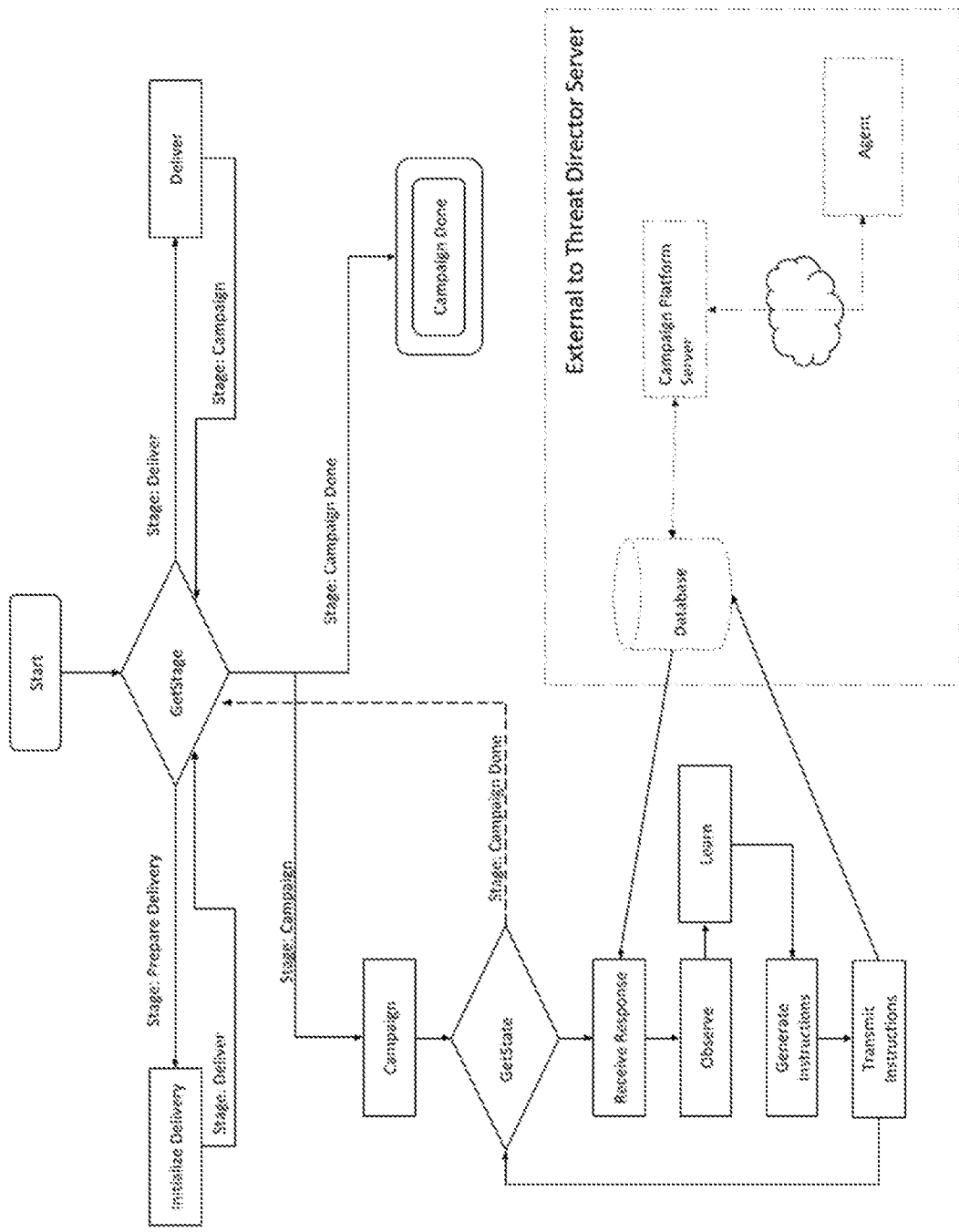
FIG. 5 illustrates an example threat director issuing requests and processing responses according to one embodiment.

The systems and methods described herein can be implemented in software or hardware or any combination thereof. The systems and methods described herein can be implemented using one or more computing devices which may or may not be physically or logically separate from each other. The methods may be performed by components arranged as either on-premise hardware, on premise virtual systems, or hosted-private instances. Additionally, various aspects of the methods described herein may be combined or merged into other functions. Example computerized systems for implementing the invention is illustrated in FIGS. 1-3. A processor or computer system can be configured to particularly perform some or all of the method described herein. In some embodiments, the method can be partially or fully automated by one or more computers or processors. The invention may be implemented using a combination of any of hardware, firmware and/or software. The present invention (or any part(s) or function(s) thereof) may be implemented using hardware, software, firmware, or a combination thereof and may be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the invention may be directed toward one or more computer systems capable of carrying out the functionality described herein. Example computing devices may be, but are not limited to, a personal computer (PC) system running any operating system such as, but not limited to, Microsoft™ Windows™. However, the invention may not be limited to these platforms. Instead, the invention may be implemented on any appropriate computer system running any appropriate operating system. Other components of the invention, such as, but not limited to, a computing device, a communications device, mobile phone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., may also be implemented using a computing device. Services may be provided on demand using, e.g., but not limited to, an interactive television (iTV), a video on demand system (VOD), and via a digital video recorder (DVR), or other on demand viewing system.

The system may include one or more processors. The processor(s) may be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices may include a display interface that may forward graphics, text, and other data from the communication infrastructure for display on a display unit.

The computer system may also include, but is not limited to, a main memory, random access memory (RAM), and a secondary memory, etc. The secondary memory may include, for example, a hard disk drive and/or a removable storage drive, such as a compact disk drive CD-ROM, etc. The removable storage drive may read from and/or write to a removable storage unit. As may be appreciated, the removable storage unit may include a computer usable storage medium having stored therein computer software and/or data. In some embodiments, a machine-accessible medium may refer to any storage device used for storing data accessible by a computer. Examples of a machine-accessible medium may include, e.g., but not limited to: a magnetic hard disk; a floppy disk; an optical disk, like a compact disk read-only memory (CD-ROM) or a digital versatile disk (DVD); a magnetic tape; and/or a memory chip, etc.

The processor may also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The processing system can be in communication with a computerized data storage system. The data storage system can include a non-relational or relational data store, such as a Redis™, MySQL™ or other relational database. Other physical and logical database types could be used. The data store may be a database server, such as Microsoft SQL Server™ Oracle™, IBM DB2™, SQLITE™, or any other database software, relational or otherwise. The data store may store the information identifying syntactical tags and any information required to operate on syntactical tags. In some embodiments, the processing system may use object-oriented programming and may store data in objects. In these embodiments, the processing system may use an object-relational mapper (ORM) to store the data objects in a relational database. The systems and methods described herein can be implemented using any number of physical data models. In one example embodiment, an RDBMS can be used. In those embodiments, tables in the RDBMS can include columns that represent coordinates. In the case of economic systems, data representing companies, products, etc. can be stored in tables in the RDBMS. The tables can have pre-defined relationships between them. The tables can also have adjuncts associated with the coordinates.

In alternative exemplary embodiments, secondary memory may include other similar devices for allowing computer programs or other instructions to be loaded into computer system. Such devices may include, for example, a removable storage unit and an interface. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units and interfaces, which may allow software and data to be transferred from the removable storage unit to computer system.

The computing device may also include an input device such as but not limited to, a mouse or other pointing device such as a digitizer, and a keyboard or other data entry device (not shown). The computing device may also include output devices, such as but not limited to, a display, and a display interface. Computer may include input/output (I/O) devices such as but not limited to a communications interface, cable and communications path, etc. These devices may include, but are not limited to, a network interface card, and modems. Communications interface may allow software and data to be transferred between computer system and external devices.

In one or more embodiments, the present embodiments are practiced in the environment of a computer network or networks. The network can include a private network, or a public network (for example the Internet, as described below), or a combination of both. The network includes hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments may include nodes, which may include hardware, software, or a combination of hardware and software. The nodes may be interconnected via a communications network. Each node may include one or more processes, executable by processors incorporated into the nodes. A single process may be run by multiple processors, or multiple processes may be run by a single processor, for example. Additionally, each of the nodes may provide an interface point between network and the outside world, and may incorporate a collection of sub-networks.

In an exemplary embodiment, the processes may communicate with one another through interprocess communication pathways supporting communication through any communications protocol. The pathways may function in sequence or in parallel, continuously or intermittently. The pathways can use any of the communications standards, protocols or technologies, described herein with respect to a communications network, in addition to standard parallel instruction sets used by many computers.

The nodes may include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present invention, a node itself can be a wide-area network (WAN), a local-area network (LAN), a private network (such as a Virtual Private Network (VPN)), or collection of networks.

Communications between the nodes may be made possible by a communications network. A node may be connected either continuously or intermittently with communications network. As an example, in the context of the present invention, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network may include BlueTooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present invention may include apparatuses for performing the operations herein. An apparatus may be specially constructed for the desired purposes, or it may comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present invention. Alternatively, the steps of the present invention can be performed by specific hardware components that contain hardwired logic for performing the steps, or by any combination of programmed computer components and custom hardware components. For example, the present invention can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present invention can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals may be stored on the computer systems for subsequent execution).

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters may also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as assembly, Flash™, JAVA™, C++, C, C #, Python, Visual Basic™, JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as JSON/XML/

SOAP/HTTP may be used in implementing interfaces between programming modules. The components and functionality described herein may be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor may receive and store instructions and data from a computerized data storage device such as a read-only memory, a random access memory, both, or any combination of the data storage devices described herein. A processor may include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the invention may be practiced with other computer system configurations, including hand-held devices, microprocessor systems, microprocessor-based or programmable consumer electronics, minicomputers, mainframe computers, etc. The invention may also be practiced in distributed computing environments where tasks are performed by remote processing devices that are linked through a network.

The terms "computer program medium" and "computer readable medium" may be used to generally refer to media such as but not limited to removable storage drive, a hard disk installed in hard disk drive. These computer program products may provide software to computer system. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the description and claims, the terms "coupled" and "connected," along with their derivatives, may be used. It should be understood that these terms may be not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm may be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it may be appreciated that throughout the specification terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently.

While one or more embodiments of the invention have been described, various alterations, additions, permutations and equivalents thereof are included within the scope of the invention.

In the description of embodiments, reference is made to the accompanying drawings that form a part hereof, which show by way of illustration specific embodiments of the claimed subject matter. It is to be understood that other embodiments may be used and that changes or alterations, such as structural changes, may be made. Such embodiments, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

What is claimed is:

1. A method for gamifying a success or failure of an attempted exploitation of an endpoint connected to a network environment, the method comprising:
providing agent software at the endpoint, the agent software initially configured for executing a limited set of instructions, the set comprising instructions for:
selecting environment attributes;
decrypting loader instructions based on the selected environment attributes decrypting a communications instruction according to the loader instructions, wherein the communications instruction is an instruction for the endpoint that specifies communications parameters according to which it will attempt to and communicate with a management server over the network environment;
defining an offensive team comprising of a set of one or more players, wherein one or more of the players are selected from automated processes or individuals;
at the management server, on behalf of the offensive team, generating an instruction message for the agent software executing at the endpoint, wherein the instruction message comprises instructions for at least:
loading a modular package of instructions for collecting specified endpoint parameters;
collecting the specified endpoint parameters according to the instructions;
transmitting one or more of the collected endpoint parameters to the management server;
determining if one or more exploits are successful in execution at the endpoint;
transmitting the success determination to the management server over a communications network environment;
at the management server:
receiving an indication of an exploit for execution at the endpoint from the offensive team;
providing the determined exploit to the endpoint through the communications network environment; and
receiving the success determination from the endpoint.

2. The method of claim 1, wherein exploitation is the taking advantage of a bug or vulnerability in order to cause unintended or unanticipated behavior to occur on computer software, hardware, or electronic device.

3. The method of claim 1, wherein the communications network environment is an arrangement of computing devices that are capable of communications among the computing devices over the network.

4. The method of claim 1, wherein the agent software at the endpoint is designed to be relatively lightweight.

5. The method of claim 1, wherein the environment attributes are selected from computer name, domain name, organizational unit, network interface card (NIC) media access control (MAC) address, internet protocol (IP) address, and serial numbers of hardware.

6. The method of claim 1, wherein the environment attributes are used as a key to decrypt enciphered instructions, and wherein:
the agent software is in the form: [flags, limited instructions, encrypted instructions];
the agent software uses an initial limited set of instructions to capture values of the environment attributes as specified by a flags field, and with these values derives the key; and
the instructions to run can be generated by decrypting the encrypted instructions with the key.

7. The method of claim 1, further comprising:
generating a heartbeat signal for communication with the management server;
waiting a configured time period for an acknowledgement signal to be sent from the management server to the endpoint;
determining whether or not the acknowledgement signal was received at the endpoint in response to the heartbeat signal; and
if an acknowledgement signal is received at the endpoint in response to the heartbeat signal, then resetting the heartbeat time interval to transmit a subsequent heartbeat signal from the endpoint to the management server; and
deleting the agent software from the endpoint if decryption of communication instructions or loader instructions fail or if no acknowledgement signal is received after a predetermined amount of time.

8. The method of claim 7, wherein the time interval can be hard coded into the agent software, or it may be calculated based on environment variables, randomized or algorithmic.

9. The method of claim 7, wherein the acknowledgement signal is a communication over the communications network environment according to a predetermined format or content.

10. The method of claim 7, wherein the reset heartbeat time interval can be hard coded or variable, or randomized.

11. The method of claim 1, wherein the modular package can provide capabilities and be provided as a pre-configured set for an identified purpose.

12. The method of claim 11, further comprising computer-implemented instructions for any one or more of: communicating according to a specified protocol; running any instruction as requested by the operator; identifying an operating system at the endpoint, the identification including a version of the operating system, service pack level, and hotfixes; identifying a hardware architecture at the endpoint; identifying a process running on the endpoint; identifying a current user on the endpoint; identifying installed software on the endpoint; map network topology; copy itself to another endpoint; persist system reboots; shadowing user actions by covertly observing what a user is doing on the endpoint.

13. A system for gamifying a success or failure of an attempted exploitation of an endpoint connected to a communications network environment, the system comprising:
agent software at the endpoint, the agent software initially configured for executing a limited set of instructions, the instructions for:
selecting environment attributes;
decrypting loader instructions based on the selected environment attributes
decrypting a communications instruction according to the loader instructions, wherein the communications instruction is an instruction for the endpoint that specifies communications parameters according to which it will attempt to and communicate with a management server over the communications network environment;

an offensive team comprising of a set of one or more players, and a defensive team comprising of a set of one or more players, wherein one or more of the players are selected from automated processes or individuals;

the management server configured for generating an instruction message for the agent software executing at the endpoint, wherein the instruction message comprises instructions for at least:

loading a modular package of instructions for collecting specified endpoint parameters;

collecting the specified endpoint parameters according to the instructions;

transmitting one or more of the collected endpoint parameters to the management server;

determining if one or more exploits are successful in execution at the endpoint; and transmitting the success determination to the management server over the communications network environment;

the management server further configured for:

receiving an indication of an exploit for execution at the endpoint from the offensive team;

providing the determined exploit to the endpoint through the communications network environment; and receiving the success determination from the endpoint.

14. The system of claim 13, wherein exploitation is the taking advantage of a bug or vulnerability in order to cause unintended or unanticipated behavior to occur on computer software, hardware, or electronic device.

15. The system of claim 13, wherein the communications network environment is an arrangement of computing devices that are capable of communications among the computing devices over the network.

* * * * *